United States Patent [19]

Perdriat

[11] Patent Number: 4,920,303

[45] Date of Patent: Apr. 24, 1990

[54] DEVICE FOR ROTARY-DRIVING A CENTRIFUGE ARM AND METHOD FOR POWER-FEEDING SAID DEVICE

[75] Inventor: Jacques Perdriat, Maule, France

[73] Assignee: Acutronic France, Les Clayes-Sous-Bois, France

[21] Appl. No.: 334,201

[22] Filed: Apr. 5, 1989

[30] Foreign Application Priority Data

Apr. 11, 1988 [FR] France ................... 88 04774

[51] Int. Cl.[5] ............................................. H02K 7/02
[52] U.S. Cl. ......................................... 318/161; 318/150
[58] Field of Search ............... 318/140, 148, 150, 151, 318/152, 153, 161, 682; 310/74, 153; 322/4

[56] References Cited

U.S. PATENT DOCUMENTS

| | | | |
|---|---|---|---|
| 4,292,531 | 9/1981 | Williamson | 318/151 X |
| 4,321,478 | 3/1982 | Plunkett et al. | |
| 4,338,525 | 7/1982 | Kilgore | 318/148 X |
| 4,629,947 | 12/1986 | Hammerslag et al. | 318/150 X |
| 4,642,535 | 2/1987 | Hucker | 310/74 X |
| 4,657,117 | 4/1987 | Lauer | 318/150 X |
| 4,837,485 | 6/1989 | Meroth et al. | 318/161 |

FOREIGN PATENT DOCUMENTS

0137607 4/1985 European Pat. Off. .
2081991 2/1982 United Kingdom .

OTHER PUBLICATIONS

*Missiles and Rockets*, vol. 15, No. 9, Aug. 31, 1964, p. 33, Ziff—Daus Publishing Co., New York, U.S., "Ames Centrifuge To Be 'Most Sophisticated'".

Primary Examiner—Bentsu Ro
Attorney, Agent, or Firm—Webb, Burden, Ziesenheim & Webb

[57] ABSTRACT

The power supply unit (20) includes an average voltage multiphase supply network (21) with power less than the theoretical power required to feed the high-power electric motor (5) for rotary-driving a centrifuge arm (1), a multiphase step-down transformer (21), a first static device (23) for controlling a multiphase rotating machine, said control device (23) having one multiphase input connected to the secondary of the multiphase transformer (22) and one multiphase output connected to a node (29) with electric linkages, one multiphase rotating machine (27) electrically connected to said node (29), a high-capacity inertia flywheel (28) mechanically coupled to said multiphase rotating machine (27) and output terminals (30) connected to said node (29). The high-power electric motor (5) is connected to the output terminals (30) by means of a second static device (7) for controlling an electric motor.

14 Claims, 3 Drawing Sheets

DEVICE FOR ROTARY-DRIVING A CENTRIFUGE ARM AND METHOD FOR POWER-FEEDING SAID DEVICE

The present invention relates to a device for rotary during a centrifuge arm and a method to for power-feeding such a device.

BACKGROUND OF THE INVENTION

The rotary-driving of centrifuge arms requires the availability of large amounts of energy with extremely short response times when it is desired to produce significant accelerations, this in particular being the case with centrifuges whose rotary arm is equipped with a swinging basket in which a pilot is placed in order to be subjected to high accelerations and decelerations as part of the simulation of flight conditions in supersonic planes, such as fighter planes.

The rotary arm of such a test centrifuge is rotary-driven from a high-powered electric motor whose rotation speed is adjusted with the aid of an electronic rectifier/inverse rectifier type control circuit if the electric motor is a synchronous or asynchronous motor. Having regard to the high instantaneous powers required to obtain high levels of acceleration or sudden acceleration variations, it is essential to have available extremely high-power electric power supply sources of about one megawatt, which involves considerable costs by having to install special power supply lines able to direct such power levels to the use sites. Moreover, these special high-power electric power lines need to be specially protected against the risks of short circuits occuring or disturbances linked to the presence of high loads whose value quickly varies with high amplitudes.

The present invention seeks to remedy the above-mentioned drawbacks and allows for the rotary-driving of a centrifuge arm with rapid rotation speed variations and high torques, without it being necessary to have special high-power electric power lines and without the rotary-driving of the centrifuge arm provoking disturbances in the electric power supply network.

The invention also seeks to offer a device for rotary-driving a centrifuge arm which provides improved safety as regards controlling the movements of the centrifuge arm, and devices suspended from this arm, such as a swinging basket intended to house a person subjected to acceleration and deceleration tests.

SUMMARY OF THE INVENTION

These objectives are attained by means of using a device for rotary-driving a centrifuge arm and comprising an electric power supply source and a high-power electric motor, wherein the electric power source includes an average voltage multiphase supply system with power less than the theoretical power required to feed the high-power electric motor, a multiphase step-down transformer, a first static device for controlling a multiphase rotary machine, said control device having one multiphase input connected to the secondary of the multiphase transformer and one multiphase output connected to a node with electric linkages, one multiphase rotary machine, preferably of the synchronous type, electrically connected to said node, a high-capacity inertia flywheel mechanically coupled to said multiphase rotary machine and output terminals connected to said node, and wherein the high-power electric motor is connected to said output terminals by means of a second static device for controlling an electric motor.

The first and second control devices are both controlled from a computer which firstly ensures the putting into operation of the first control device in order to drive the synchronous motor-powered rotary machine until it reaches its synchronism speed, and secondly ensures the putting into operation of the second control device so as to use the electric drive motor of the centrifuge arm.

The first control device may have a time constant higher than that of the second control device.

According to one more particularly advantageous embodiment, the high-power electric motor is of the multiphase reciprocating motor type and constitutes a vertical axis torque motor directly driving the arm of the centrifuge mounted on the upper part of the motor.

The invention also concerns a method to power-feed a high-power electric motor for rotary-driving a centrifuge arm, especially for a drive centrifuge for pilots, wherein it consists of appropriating the power on an average voltage multiphase main supply network with power less than the theoretical power required to feed the high-power electric motor ; of gradually storing in an inertia flywheel coupled to a multiphase motor-powered rotary machine, preferably of the synchronous type, a large amount of kinetic energy from the average voltage multiphase main supply network ; of taking into the main supply network the energy required to maintain the rotation speed of the multiphase machine within the limits of the power available on this network, of appropriating one part of the kinetic energy stored in the inertia flywheel when the dynamic movement of the centrifuge arm requires a power greater than that available on the main supply network and, in the event of a slowing down or sudden stoppage of rotation of the arm of the centrifuge, to transfer to the inertia flywheel the kinetic energy available on the centrifuge arm by means of the multiphase machine functioning as a motor.

More particularly, it is possible to select a synchronous machine/inertia flywheel asesmbly whose moment of inertia with respect to that of the centrifuge arm is such that the output frequency of the synchronous machine is kept between about 48 and 53 Hz.

BRIEF DESCRIPTION OF THE DRAWINGS

Other characteristics and advantages of the present invention shall appear more readily from a reading of the following description of particular embodiments given by way of example and with reference to the accompanying drawings in which.

MORE DETAILED DESCRIPTION

Figure 1:
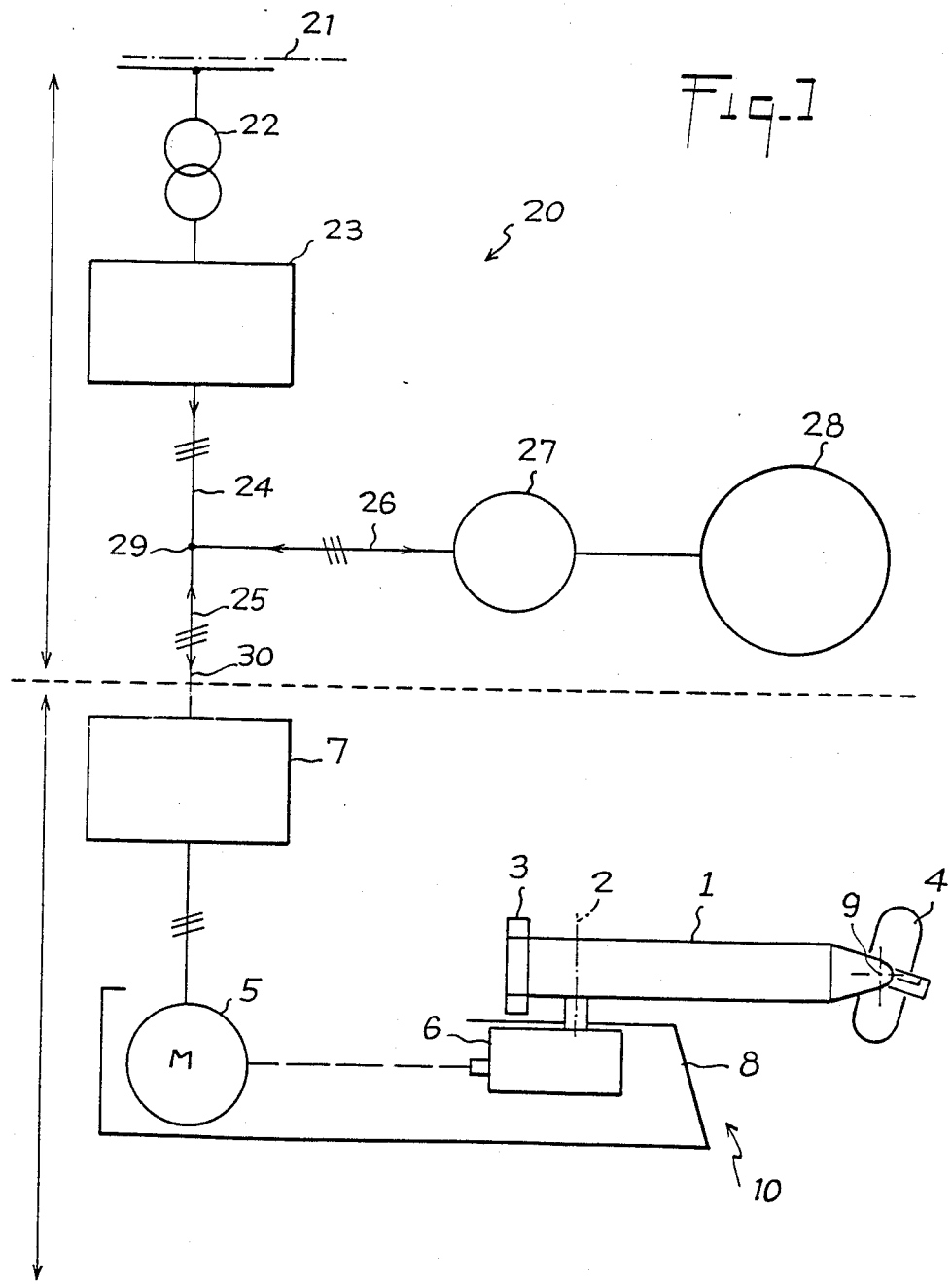
FIG. 1 is a diagrammatic view of an assembly of a device for electric power-feeding and rotary-driving a centrifuge arm, especially drive centrifuges for pilots.

By way of example, the description shall consider a human centrifuge 10 for driving by pilots and comprising a horizontal rotary arm 1 mounted pivoting around a vertical axis 2 and bearing at one of its extremities a swinging basket 4 by means of a joint system 9 so as to have one or two degress of tilting freedom with respect to the arm 1. On the side of its extremity opposite the swinging basket 4, the arm is provided with a counter-weight 3. According to the possible embodiment shown on FIGS. 1 and 3, the horizontal arm 1 is rotary-driven from a low-torque electric motor 5 by means of a speed reducing gear pair 6. The body of the motor 5 and of the speed reducing gear pair 6 are solidly anchored to the floor on a base 8. The electric motor 5 may be a d.c. motor, but preferably should be constituted by a synchronous or asynchronous three-phase motor, its power being ensured by means of an electronic control circuit 7 of the thyristor rectifier/inverse rectifier type, which supplies a three-phase voltage power supply and variable frequencies from an electric power source 20.

A centrifuge 10, such as the one represented diagrammatically on the drawings, may in particular be intended to allow for drive by air pilots installed in the swinging basket 4. The movements of the rotary arm 1 and the swinging basket 4 can in fact be controlled so as to recreate acceleration variations or keeping of accelerations at high levels similar to the flight conditions in aeroplanes, especially fighter, planes. Thus, it is possible to verify the capacity of pilots to accept acceleration stresses and to carry out manoeuvres seeking to overcome or avoid the harmful effects of these accelerations.

The rotary arm 1 of the centrifuge may have a length of about from 6 to 10 meters and generates a centrifugal acceleration proportional to the square of the speed of rotation.

The swinging basket 4 according to two degrees of freedom at one extremity of the rotary arm 1 makes it possible to maintain the combined accelerations due to centrifugal force and gravity according to a direction parallel to the plane of the vertebral column of the pilot.

The rotary arm 1 may be constituted, for example, by one or two tubes with a large diameter and having high torsion and bending stiffness.

The electric motor 5 driving the rotary arm 1 and the control circuit 7 are controlled so as to drive the arm 1 at a variable speed according to the acceleration conditions required at the level of the swinging basket 4. A computer makes it possible to follow a pre-established program of tests whilst enabling these tests to be interrupted should there be a risk of danger occuring to the pilot subjected to said tests.

The functioning of a centrifuge 10, such as the one described above, involves rapidly having available a large amount of electric energy when the swinging basket of the centrifuge requires wide acceleration variations. This normally involves the presence of a local network for supplying electric energy able to support extremely high power levels. The present invention makes it possible to eliminate the need to have such a high-power supply network by virtue of using an accessory device for adjusting rushes of current 22 to 29 which can be associated with a normal supply network 21 with relatively low power so as to constitute a power supply 20 meeting the conditions required to feed the control circuit 7 and also the centrifuge motor 5.

By way of example, a motor 5 and a motor control circuit 7, requiring instantaneous power ranging up to 1.75 MW to drive the centrifuge arm 1, can function from a conventional three-phase supply network supplying a power of 150 kW to the extent that an accessory device is used to adjust rushes of current 22 to 29, such as the accessory device represented on FIG. 1.

Such an accessary device includes a three-phase stepdown input transformer 22 whose primary is connected to the average voltage and relatively low power three-phase supply network 21. The secondary of the transformer 22 is connected to a control device 23 of an electric three-phase machine 27 mechanically coupled to an inertia flywheel 28.

The control device 23 may be constituted by a static converter of the thyristor rectifier/inverse rectifier type so as to output-provide a three-phase supply whose voltage and frequency are continuously adjustable.

The accessory device for adjusting rushes of current has a linking node 29 connected to the output of the control device 23 by lines 24, to the three-phase rotary machine 27 by lines 26 and to the supply terminals of the control device 7 of the motor 5 by lines 25.

The electric three-phase machine 27 may be a synchronous or asynchronous type machine. However, in the continuation of the description, only the use of a synchronous machine shall be considered whose response time is more reduced.

By way of example, for a rotary arm 1 having a moment of inertia of 120,000 m2 Kg, the inertia flywheel 28 may have a moment of inertia of about 720 m2 kg. The ratio between the moments of inertia of the rotary arm 1 and the inertia flywheel 28 is determined in such a way that the output frequency of the synchronous machine 27 functioning as an alternator is included in a well-determined range of frequencies, for example between 48 and 53 Hz, if the frequency of the supply network 21 is 50 Hz.

The synchronous machine 27 is dimensioned so as to be able to supply at standard capacity, when it functions as an alternator, a power of, for example, about 1100 kW, the centrifuge motor 5 itself having a power of the same order of magnitude.

The functioning of the accessory device 22 to 29, and thus of the energy source unit 20 delivering to the terminals 30 the electric energy required for functioning of the control device 7 and the motor 5, is as follows:

Initially, before rotating the centrifuge arm 1, the control device 23 provides the three-phase supply of the synchronous machine 27 functioning as a motor. The synchronous motor 27 drives with a constant torque the inertia flywheel 28 which stores the kinetic energy.

When the synchronous machine 27 has reached its synchronous rotation speed, the centrifuge motor 5 can be started by the control device 7 which appropriates the electric energy by the lines 26, 25 from the synchronous machine 27 functioning as an alternator.

If the speed of the synchronous alternator 27 tends to be reduced on account of the energy being taken by the centrifuge motor 5, the control device 23 of the synchronous machine 27 shunts the energy of the main supply network 21 so as to apply it by the lines 24, 26 to the synchronous machine 27 then functioning as a motor. If, in this case, the dynamic movement of the centrifuge arm 1 requires more power than the power available at this moment in the main supply network 21, one part of the kinetic energy stored in the inertia flywheel 28 is transferred to the centrifuge arm 1.

Conversely, in the case where the centrifuge arm 1 is quickly stopped, the kinetic energy of this arm 1 is sent back to the inertia flywheel 28 via the electric energy applied to the terminals 30 and sent back by the lines 25, 26 to the synchronous machine 27 functioning as a motor.

For constant rotation speeds of the centrifuge, the low amount of power dissipated in the circuits and windings of the motor is supplied by the main supply network 21 through the control device 23 and the lines 24, 25.

The electric energy power supply device 21 according to the invention thus makes it possible to embody four functions which avoid the need to have a high-power electric supply network:

progressive storing of a large amount of kinetic energy in an inertia flywheel from an average power supply network, rapid transfer of one part of the stored kinetic energy from the inertia flywheel to the centrifuge arm for a rapid increase of acceleration of the centrifuge, rapid transfer in the opposite direction of the kinetic energy from the centrifuge to the inertia flywheel for a fast reduction of acceleration of the centrifuge, supplying of the electric energy required to compensate the losses in the circuits and to take account of air resistance.

The electric supply device according to the invention also has several significant advantages. Thus, the supply network 21 is protected against risks, which may create sudden variations of significant loads, and the risks of any electromagnetic interference induced in the supply network 21 is reduced. Moreover, a continuous functioning of the centrifuge can be maintained without interference occuring, even when the supply of the network 21 has short temporary interruptions lasting several seconds.

Having regard to the different roles played by the control circuits 23 and 7, the time constant of the control circuit 23 of the synchronous machine 27 may be greater than that of the control circuit 7 of the motor 5.

Figure 2:
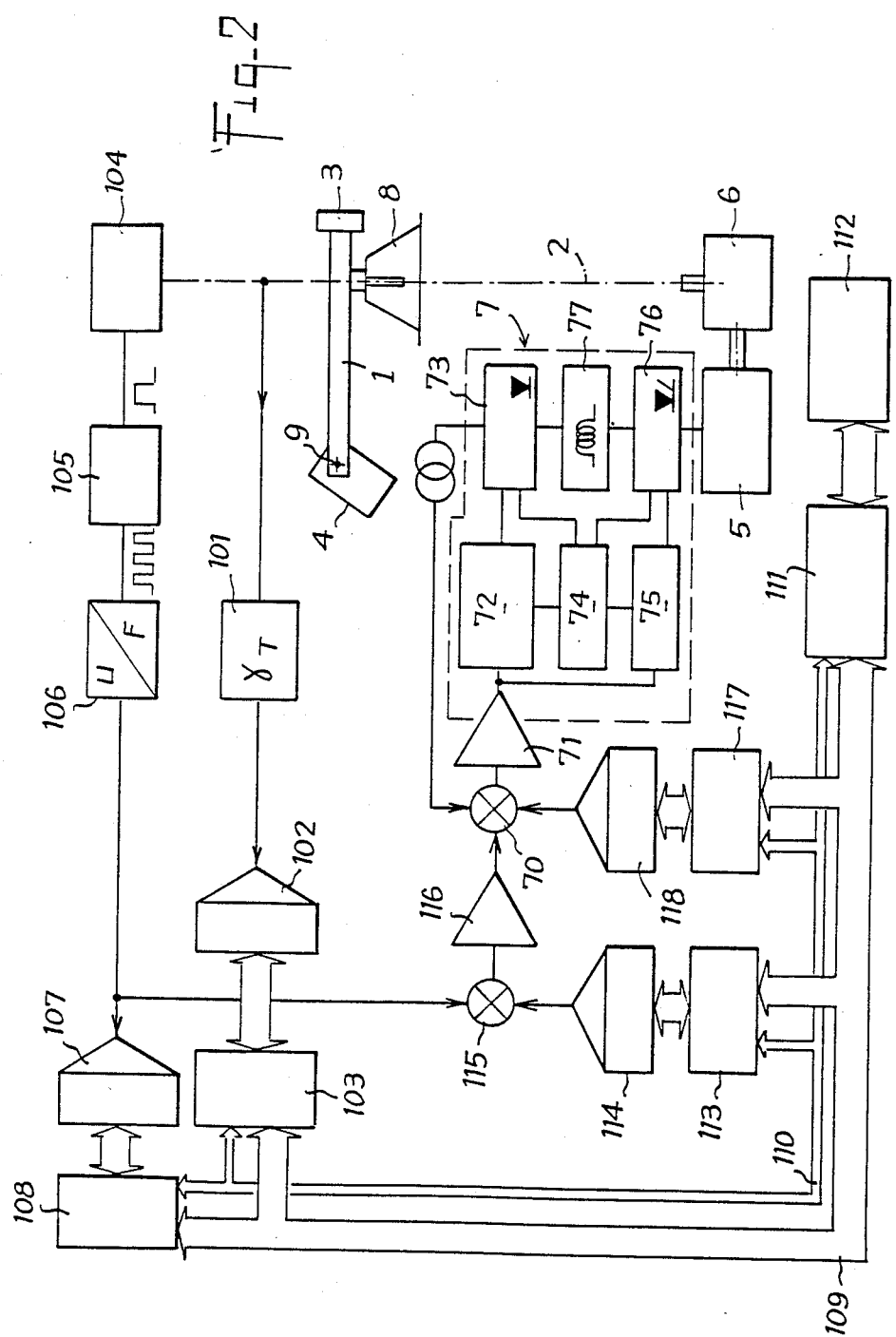
FIG. 2 is a block diagram more particularly showing the control and automatic control circuits of the electric drive motor of a centrifuge arm.

With reference to FIG. 2, there now follows a brief description of the control circuits of the centrifuge arm 1.

The device for controlling the rotation movements of the centrifuge arm 1 mainly includes an analog type control around an internal current loop.

The speed of rotation of the arm 1 of the centrifuge is determined by an optical encoder 104 delivering signals to a circuit 105 for shaping pulses, said circuit being connected to a voltage-frequency converter 106 whose output is applied firstly to an input comparator 115 of a control loop comprising an amplifier 116, and secondly to an analog-digital converter 107 connected by a multiplex buffer stage 108 to the data 109 and address 110 bus communicating via a parallel interface 111 with the central processing unit 112 of the computer managing the system.

The tangential acceleration on the arm 1 is measured by an acceleration meter 101 whose output signals are applied by an analog-digital converter 102, a buffer stage 103 and the buses 109, 110 to the central processing unit 112 of the computer. The computer makes it possible to apply, via a buffer stage 113 and an analog-digital converter 114, analog signals to the comparator 115 and, via a buffer stage 117 and an analog-digital converter 118, analog signals to a comparator 70 placed at the output of the amplifier 116 and at the input of an internal current loop. The comparator 70 thus receives the signals of any negative current feedback corresponding to the current applied to the control device 7 of the motor 5 so as to adjust the speed of rotation of this motor 5.

When the motor 5 is of the synchronous type, the control device 7 is constituted by a device of the inverse rectifier/rectifier type and includes a rectifier stage 73, a stage 77 for treating the d.c. current and an inverse rectifier stage 76 applying a three-phase current of variable voltage and frequency to the motor 5. The amplifier 71 of the internal current loop applies signals to the control devices 72, 75 of the rectifier 73 and inverse rectifier 76 stages, said stages also being connected to a protection circuit 74. The control circuits may be embodied conventionally and thus shall not be described in more detail.

In the case of a human centrfiuge, the swinging basket 4 is itself equipped with two torque motors so as to allow for tiltings around two rectangular axes. Each motor includes a rotor and a stator which are each directly attached to the mechanical parts between which a relative movement of rotation shall be produced. Each torque motor is individually fed with power by a three-phase amplifier provided with circuits for adjusting the amplitude and frequency of the current supplied. Acceleration meters make it possible to measure the accelerations according to the two axes whereby the position of the swinging basket needs to be adjusted. The control circuits of the position of the swinging basket 4 cooperating with the torque motors and the acceleration meters may be conventional and shall not be described in detail.

Figure 4:
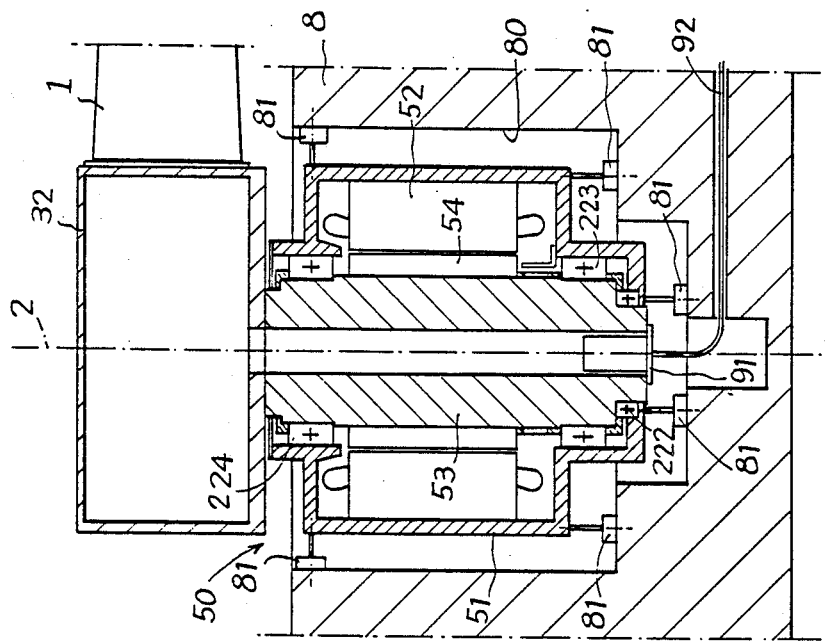
FIG. 4 is a cutaway view according to the axis of rotation of a centrifuge arm showing a preferred embodiment with direct drive by means of a high torque electric motor.
Figure 3:
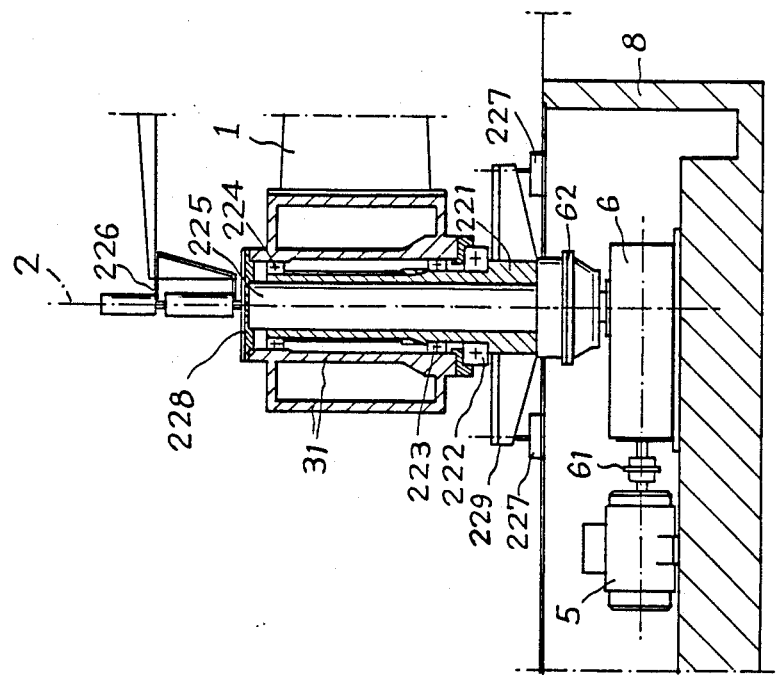
FIG. 3 is a cutaway view according to the axis of rotation of a centrifuge arm showing an example of driving by means of a back-geared motor unit.

There now follows a description with reference to FIGS. 3 and 4 of two embodiments of motors 5 for driving the rotary arm 1 of the centrifuge.

According to a first embodiment shown on FIG. 3, the mounting of the rotary arm 1 is effected with the aid of a vertical hollow shaft of large diameter 221 supported by a four-branch star 229 secured to a concrete base by feet 227 constituted by steel springs equipped with strain gauges making it possible to measure any dynamic unbalances.

The turret head 31, on which the arm 1 is mounted, is itself mounted on the hollow shaft 221 with the aid of two radial roller bearings 223, 224 and a lower stop 222. The vertical transmission shaft 225 is disposed at the center of the hollow shaft 221 and coupled to the turret head 31 by a diaphragm 228 and to a speed reducing gear pair 6 by a coupler 62.

The speed reducing gear pair 6, whose reduction ratio may be, for example, 1/25, has one horizontal input axis and one vertical output axis. The input and output axes are coupled by couplers 61, 62 to gears respectively with the motor 5 and the shaft 225. In the case of the embodiment of FIG. 3, the high-power motor 5 has a low torque and may have a speed of rotation able to be adjusted from 0 to 1000 rpm.

The electric links between the swinging basket integral with the rotary arm 1 and the electric supply source or the control computer placed in positions secured to the ground are effected by means of rotary contacts 226 located above the vertical rotary shaft 225.

FIG. 4 shows a further embodiment of the drive of a rotary arm 1. This other embodiment example has several considerable advantages compared with the embodiment of FIG. 3 and shall be regarded as a preferential embodiment.

FIG. 4 also shows a rotary arm 1 with its turret head 32, which is directly driven from a high-power low torque electric motor 50, which ensures all the functions played by the elements 5, 61, 6, and 62 of FIG. 3. Thus, the motor 50 includes an internal vertical rotor 53 able to revolve around the vertical axis of rotation 2 of the rotary arm and at the upper part of said arm on which the turret head 32 is mounted and an external stator 51 mounted directly inside a housing 80 formed inside a masonry foundation 8. The rotor 53 is mounted inside the stator 51 with the aid of radial bearings 223, 224 and a lower axial stop 222. The references 52 and 54 respectively denote the inductor and rotor of the motor 50 of FIG. 4. The reference 91 denotes a rotaty contact disposed at the lower part of the rotor 53 and ensuring via wires 92 the electric linkings between the control block disposed close to the centrifuge and the devices disposed inside the housing provided in the turret head 32.

The housing of the stator 51 of the motor 50 is mounted inside the housing 80 by feet 81 able to be embodied similarly as the feet 227 of FIG. 3 and provided with strain gauges.

The embodiment of FIG. 4, which uses a multiphase reciprocating electric motor 50 of the same power as that of the motor 5 of FIG. 5, has several advantages owing to the direct drive of the centrifuge arm 1.

Thus, the suppression of the speed reducing gear pair 6 and the couplers 61 and 62 eliminates the toothing noise likely to interfere with control, as well as any problems relating to the behavior of these toothings at high variations of the torque transmitted.

The resonance frequencies of the line/shaft-pivot rotating part assembly can be increased by at least one order of magnitude, the resonance frequency being about 2 Hz in the case of the mounting shown on FIG. 3 and about 20 Hz for the case of the mounting shown on FIG. 4. Similarly, the resonance frequencies of the fixed part of the pivot can be increased by at least one order of magnitude.

In the mounting of FIG. 4, the revolving contacts and joints are integrated into the motor axis of the machine 1, and the number of revolving parts is reduced, which simplifies the production of essential parts and ensures mounting, maintenance and operational safety.

Moreover, in the rotating part of the pivot constituting the turret head 32, a high volume is available for the shipping of the electronic control circuits of the swinging basket and various measuring devices, whereas the mounting of FIG. 3 results in limiting the available volume in the turret head 31.

Generally speaking, the invention can be applied to installations in which the high-power electric motor 5, 50 has a power equal to or greater than about one megawatt, whereas the average voltage multiphase supply network has a power of about one tenth of the power of the electric motor 5, 50.

What is claimed is:

1. A device for rotary driving a centrifuge arm, comprising:
    a high power electric motor for driving the centrifuge arm; an electric power supply source having an average voltage multiphase supply network, wherein the network provides less power to the motor than the theoretical power required by the motor;
    a multiphase voltage step-down transformer connected to said network;
    a multiphase rotary machine;
    a first static device for controlling said rotary machine, said first static device having a multiphase input connected to the secondary winding of the step-down transformer, a multiphase output connected to a node of electric linkages, and the rotary machine is electrically connected to said node;
    a high capacity inertia flywheel mechanically coupled to said rotary machine;
    output terminals connected to said node;
    a second static device connected between the output terminals and the high power electric motor for controlling the high power electric motor.

2. The device according to claim 1, wherein the multiphase rotary machine is a synchronous rotary machine.

3. The device according to claim 1, wherein the high power electric motor has a power equal to or greater than one megawatt and the average voltage multiphase supply network has a power of about one tenth of the power of the electric motor.

4. The device according to claim 1, wherein the first static device has a time constant higher than that of the second static device.

5. The device according to claim 2, wherein the first and second static devices are controlled by a computer which operates the first static device to drive the synchronous rotary machine as a motor until it reaches its synchronism speed, then operates the second static device to drive the electric motor for the centrifuge arm.

6. The device according to claim 1, wherein the high power electric motor is a reciprocating type motor.

7. The device according to claim 1, wherein the high power electric motor is a low torque multiphase reciprocating type motor and is coupled to the centrifuge arm via a speed reducing gear pair.

8. The device according to claim 1, wherein the high power electric motor is a multiphase reciprocating type and constitutes a vertical axis torque motor directly driving the centrifuge arm mounted on the upper part of the motor.

9. The device according to claim 8, wherein the vertical axis torque motor includes a stator placed inside a cavity formed in a masonry foundation.

10. The device according to claim 8, wherein the vertical axis torque motor includes rotary contacts and joints which are integrated inside the motor.

11. The device according to claim 8 further includes a chamber integral with the centrifuge arm formed above the motor in order to receive measuring instruments and control circuits of a swinging basket mounted at one extremity of the centrifuge arm.

12. A method for feeding a high power electric motor to drive a centrifuge arm for pilots, comprising the steps of:
    appropriating energy on an average voltage multiphase main supply network which provides less power to the high power electric motor than the theoretical power required by the high power electric motor;
    progressively storing a large amount of kinetic energy in an inertia flywheel coupled to a multiphase rotary machine, said rotary machine functioned as a motor and received power from the average voltage multiphase main supply network;
    taking the energy required from the multiphase rotary machine functioned as a generator to feed the high power electric motor to drive the centrifuge arm;
    appropriating from the average voltage multiphase main supply network the energy required to maintain the speed of rotation of the multiphase rotary machine within the limits of the power available on the network;

appropriating one part of the kinetic energy stored in the inertia flywheel when the dynamic movement of the centrifuge arm requires a power greater than that is available from the network; and in the event of a slowing down or sudden stoppage of rotation of the centrifuge arm, transferring the kinetic energy available on the centrfuge arm to the inertia flywheel by means of the multiphase rotary machine functioned as a motor.

13. The method according to claim 12 wherein the rotary machine is a synchronous type multiphase rotary machine.

14. The method according to claim 13, wherein the combination of the synchronous rotary machine and the inertia flywheel having a total moment of inertia with respect to the centrifuge arm is so selected that the output frequency of the synchronous rotary machine is kept between 48 and 53 Hz.

* * * * *